United States Patent Office 3,210,429
Patented Oct. 5, 1965

3,210,429
FRIEDEL-CRAFTS ALKYLATION WITH THIOCYANATES
George A. Olah, Sarnia, Ontario, Canada, assignor to The Dow Chemical Company, Midland, Mich., a corporation of Delaware
No Drawing. Filed July 5, 1962, Ser. No. 207,789
14 Claims. (Cl. 260—649)

This invention relates to an improved process employing Friedel-Crafts catalysts. Specifically, the invention relates to a process for preparing compounds having the formula:

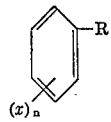

wherein R represents either the alkyl, benzyl or cyclohexyl radical, $x$ is either a halogen having an atomic number from 9 to 53 or an alkyl group, and $n$ is an integer from 0 to 3. As a preferred sub-genus are the compounds wherein R represents either the lower alkyl, benzyl or cyclohexyl radicals, $x$ represents a halogen having an atomic number from 9 to 53 or the lower alkyl group, and $n$ is an integer from 0 to 3.

The term "lower alkyl" is used herein to denote an alkyl group containing from 1 to about 4 carbon atoms.

The novel process is conveniently practiced by reacting by contacting an aromatic compound having the formula:

wherein $x$ and $n$ have the same significance as previously described, with an organic thiocyanate having the formula:

RSCN wherein R has the same significance as previously described, and in the presence of a Friedel-Crafts type catalyst. The thus-formed product is then easily separated from the reaction mixture by conventional procedures, such as by distillation.

The preferred temperature for the reaction will vary depending on the particular system being used. Generally, however, the temperature is maintained between about 30° and 120° C.

Friedel-Crafts type catalysts, in general, are operable in this novel process. Specific catalysts that have been found to give excellent results are aluminum chloride and boron trifluoride. Other catalysts that can be used are zinc chloride, aluminum bromide and hydrogen fluoride.

The reactants and catalyst are employed suitably in proportions of 1 to about 10 moles of catalyst and 2 to about 5 moles of aromatic compound per mole of thiocyanate, preferably from 1 to 2 moles of catalyst and about 4 moles of aromatic compound per mole of thiocyanate.

The process of the present invention results in generally excellent yields of the desired aromatic compounds. This is surprising when taken in view of the ineffectiveness of the analogous alkyl cyanates as starting materials in this process.

The practice of the present invention is illustrated by a series of experiments in each of which 2 moles of an aromatic compound and 0.5 mole of an organic thiocyanate, each of the respective genera previously described, were reacted in the presence of 0.6 mole of a Friedel-Crafts type catalyst. The reactions were run for a period of several hours, the product washed with water and separated by distillation and the yield calculated. There are shown in Table I for each experiment conducted, the thiocyanate, aromatic compound, and catalyst used, the reaction temperature, and the yield obtained,

Table I

| Exp. No. | Thiocyanate | Aromatic Compound | Catalyst | Temp., °C. | Yield, Percent |
|---|---|---|---|---|---|
| 1 | Methyl | Benzene | AlCl³ | 78 | 58 |
| 2 | Ethyl | do | AlCl³ | 78 | 55 |
| 3 | n-Propyl | do | AlCl³ | 78 | 61 |
| 4 | n-Butyl | do | AlCl³ | 78 | 45 |
| 5 | Benzyl | do | AlCl³ | 78 | 71 |
| 6 | Cyclohexyl | do | AlCl³ | 78 | 43 |
| 7 | n-Butyl | Toluene | BF³ | 50–80 | 37 |
| 8 | Benzyl | do | BF³ | 50–80 | 56 |
| 9 | Ethyl | Fluorobenzene | AlCl³ | 85 | 49 |
| 10 | Benzyl | do | AlCl³ | 85 | 55 |
| 11 | do | Chlorobenzene | AlCl³ | 100 | 38 | based on the starting materials employed.

In addition to those compounds specifically disclosed, other aromatic compounds within the scope of the present invention can be prepared from analogous starting materials, such as 2,3-dichloro-n-amylbenzene, 2,4-difluoro-n-hexylbenzene, 2,3-dibromo-4-iodo-n-heptylbenzene, 2,3-difluoro-n-octylbenzene, 2,4,5-trifluoro-n-decylbenzene, 2-bromo-4-fluoro-n-dodecylbenzene, 2-bromo-5-fluoro-n-tetradecylbenzene, 2-iodo-4,5-dibromo-n-hexadecylbenzene, and 2-chloro-4-bromo-5-fluoro-n-octadecylbenzene.

I claim:
1. A process for preparing compounds having the formula:

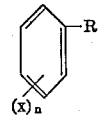

wherein R is a member selected from the group consisting of the alkyl, benzyl, and cyclohexyl radicals, x represents a member selected from the group consisting of a halogen having an atomic number from 9 to 53 and an alkyl group, and $n$ is an integer from 0 to 3, said process comprising reacting by contacting at from 30° to 120° C. an aromatic compound having the formula:

wherein x and $n$ have the same values as previously described, with a thiocyanate having the formula:

RSCN wherein R has the same value as previously described, in the presence of a Friedel-Crafts catalyst, and separating the thus-formed compound from the reaction mixture.

2. A process as in claim 1 wherein the aromatic compound is benzene.

3. A process as in claim 1 wherein the aromatic compound is toluene.

4. A process as in claim 1 wherein the aromatic compound is chlorobenzene.

5. A process as in claim 1 wherein the aromatic compound is fluorobenzene.

6. A process as in claim 1 wherein R is methyl.

7. A process as in claim 1 wherein R is ethyl.

8. A process as in claim 1 wherein R is n-butyl.

9. A process as in claim 1 wherein R is benzyl.

10. A process as in claim 1 wherein R is cyclohexyl.

11. A process as in claim 1 wherein the catalyst is aluminum chloride.

12. A process as in claim 1 wherein the catalyst is boron trifluoride.

13. A process as in claim 1 wherein the catalyst is employed in the proportion of from 1 to about 10 moles of catalyst and 2 to about 5 moles of the aromatic compound per mole of thiocyanate.

14. A process as in claim 1 wherein the catalyst is employed in the proportion of from 1 to 2 moles of catalyst and about 4 moles of the aromatic compound per mole of thiocyanate.

References Cited by the Examiner

Adams et al.: "Organic Reactions," vol. III, pp. 2–16, (1962).

LEON ZITVER, *Primary Examiner.*